(12) United States Patent
Monti

(10) Patent No.: US 11,352,159 B2
(45) Date of Patent: Jun. 7, 2022

(54) APPARATUS FOR EXTRACTING STACKED ARTICLES FROM A CARDBOARD CONTAINER

(71) Applicant: MARCHESINI GROUP S.p.A., Pianoro (IT)

(72) Inventor: Giuseppe Monti, Pianoro (IT)

(73) Assignee: MARCHESINI GROUP S.P.A, Bologna (IT)

( * ) Notice: Subject to any disclaimer, the term of this patent is extended or adjusted under 35 U.S.C. 154(b) by 0 days.

(21) Appl. No.: 17/281,715

(22) PCT Filed: Sep. 19, 2019

(86) PCT No.: PCT/IB2019/057918
§ 371 (c)(1),
(2) Date: Mar. 31, 2021

(87) PCT Pub. No.: WO2020/079501
PCT Pub. Date: Apr. 23, 2020

(65) Prior Publication Data
US 2022/0024624 A1    Jan. 27, 2022

(30) Foreign Application Priority Data

Oct. 17, 2018  (IT) .................. 102018000009512

(51) Int. Cl.
*B65B 69/00*  (2006.01)
*B65B 43/44*  (2006.01)
(Continued)

(52) U.S. Cl.
CPC ............. *B65B 69/00* (2013.01); *B65B 43/39* (2013.01); *B65B 43/44* (2013.01); *B65G 59/04* (2013.01)

(58) Field of Classification Search
CPC ...... B65G 65/34; B65G 65/40; B65G 47/248; B65G 59/04; B65B 69/00; B65B 43/39; B65B 69/0083; B65B 1/06
See application file for complete search history.

(56) References Cited

U.S. PATENT DOCUMENTS 3,527,369 A * 9/1970 Selonke ................ A24C 5/356
                                                            414/414
3,939,984 A * 2/1976 Butner .................... B65B 35/04
                                                            53/53
(Continued)

FOREIGN PATENT DOCUMENTS

DE        19505260 A1   8/1996
WO    WO 2014/098668 A1   6/2014

*Primary Examiner* — Gregory W Adams
(74) *Attorney, Agent, or Firm* — R. Neil Sudol; Henry D. Coleman

(57) ABSTRACT

Apparatus for extracting stacked articles from cardboard containers includes a store receiving the containers with a bottom closed by a tab; a rest and sliding plane substantially vertical and transversal to the store; a channel in a second unloading position, distant from the first pick-up position, for unloading the articles in the containers; abutting and folding means, lateral to the store near the first pick-up position for abutting and folding about the tab and opening the bottoms of the containers; an abutting plane substantially horizontal and transversal to the rest and sliding plane and lateral to the store between the first pick-up position and the unloading channel, to retain the articles inside the containers once the bottoms are open, and having an opening at the inlet of the unloading channel.

11 Claims, 12 Drawing Sheets

(51) Int. Cl.
*B65B 43/39* (2006.01)
*B65G 59/04* (2006.01)

(56) References Cited

U.S. PATENT DOCUMENTS

| | | | | |
|---|---|---|---|---|
| 4,324,523 | A | * | 4/1982 | Zablocky ................ B65B 69/00 221/268 |
| 4,575,301 | A | * | 3/1986 | Lodi ....................... A24C 5/356 414/420 |
| 5,937,497 | A | * | 8/1999 | Robinson ................ B65B 69/00 156/934 |
| 6,517,306 | B1 | * | 2/2003 | Budny .................... B65B 69/00 414/420 |
| 7,578,297 | B2 | * | 8/2009 | Villarinho ............... B65B 69/00 131/281 |

* cited by examiner

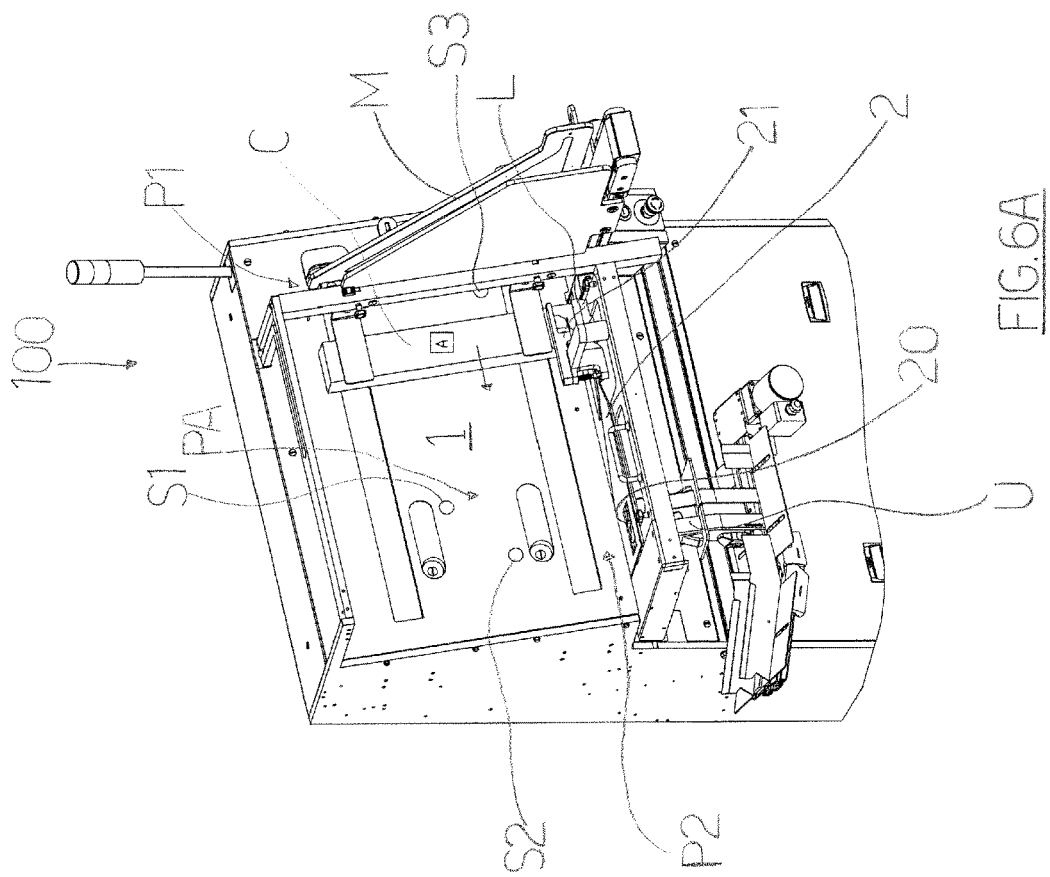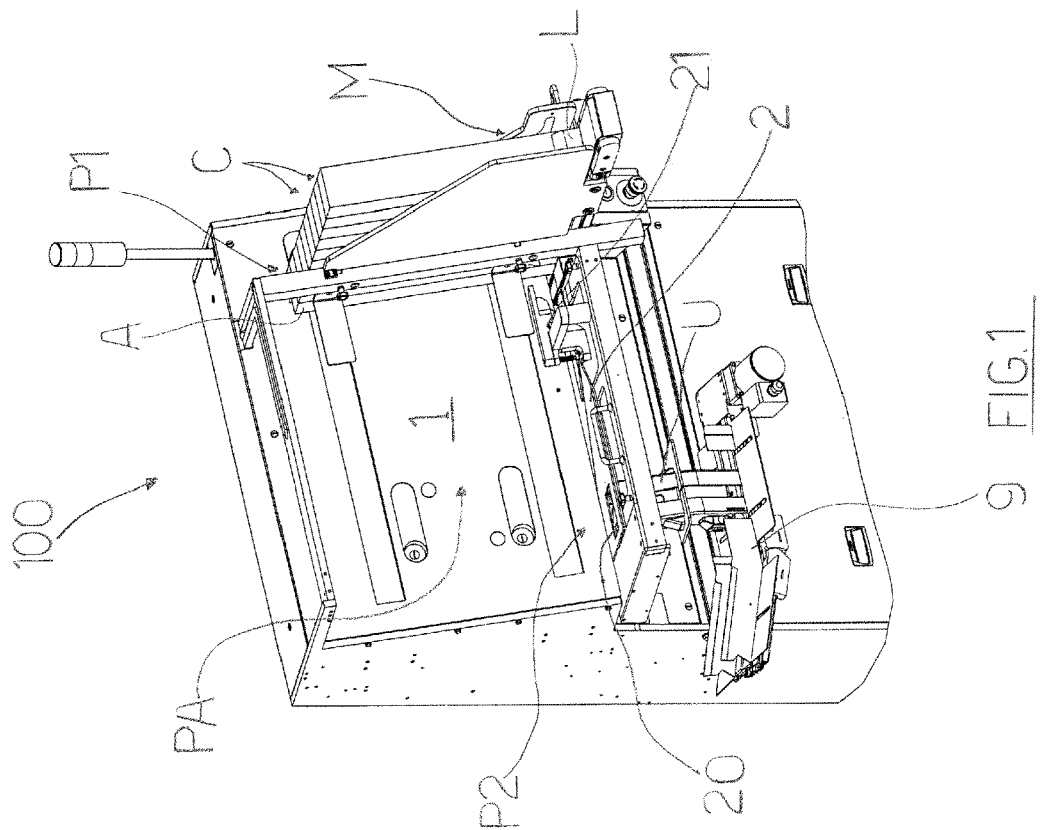

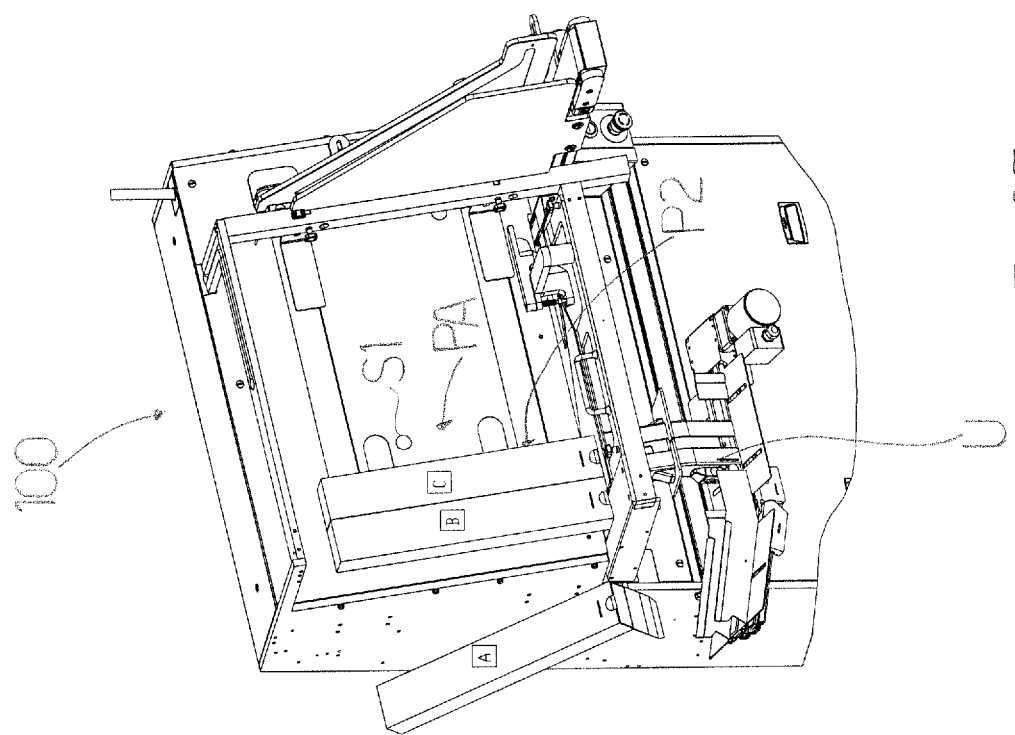
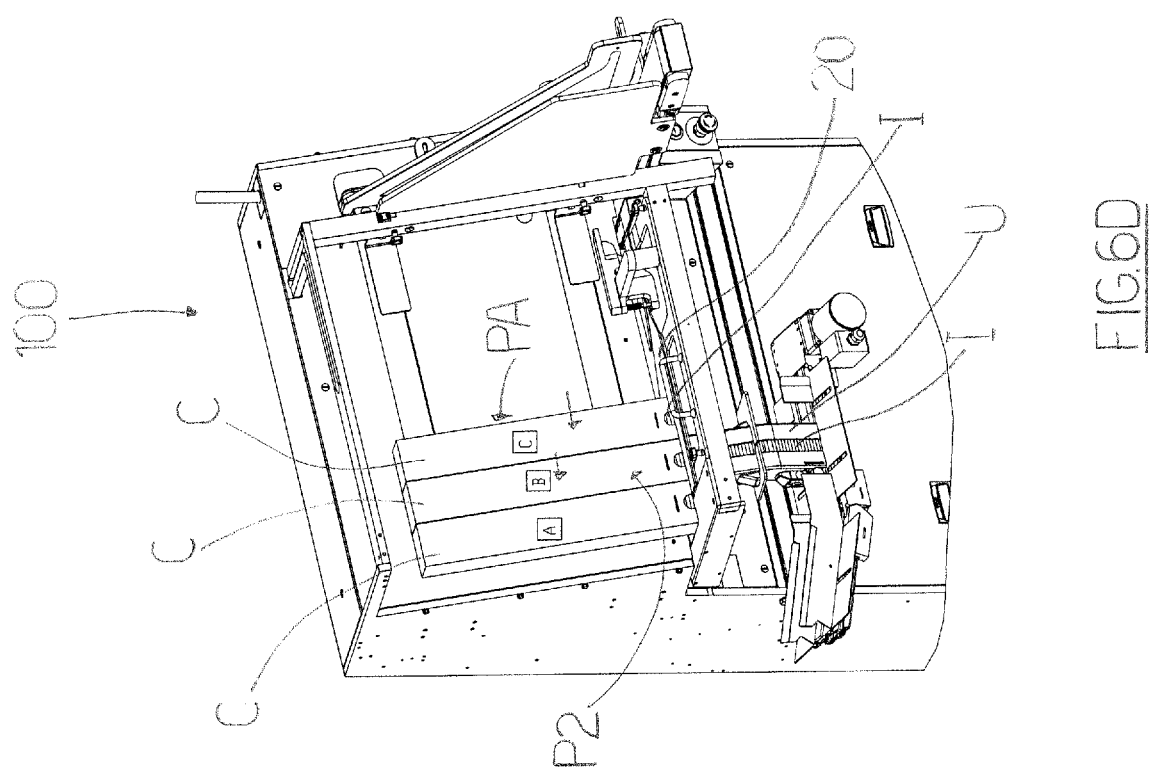

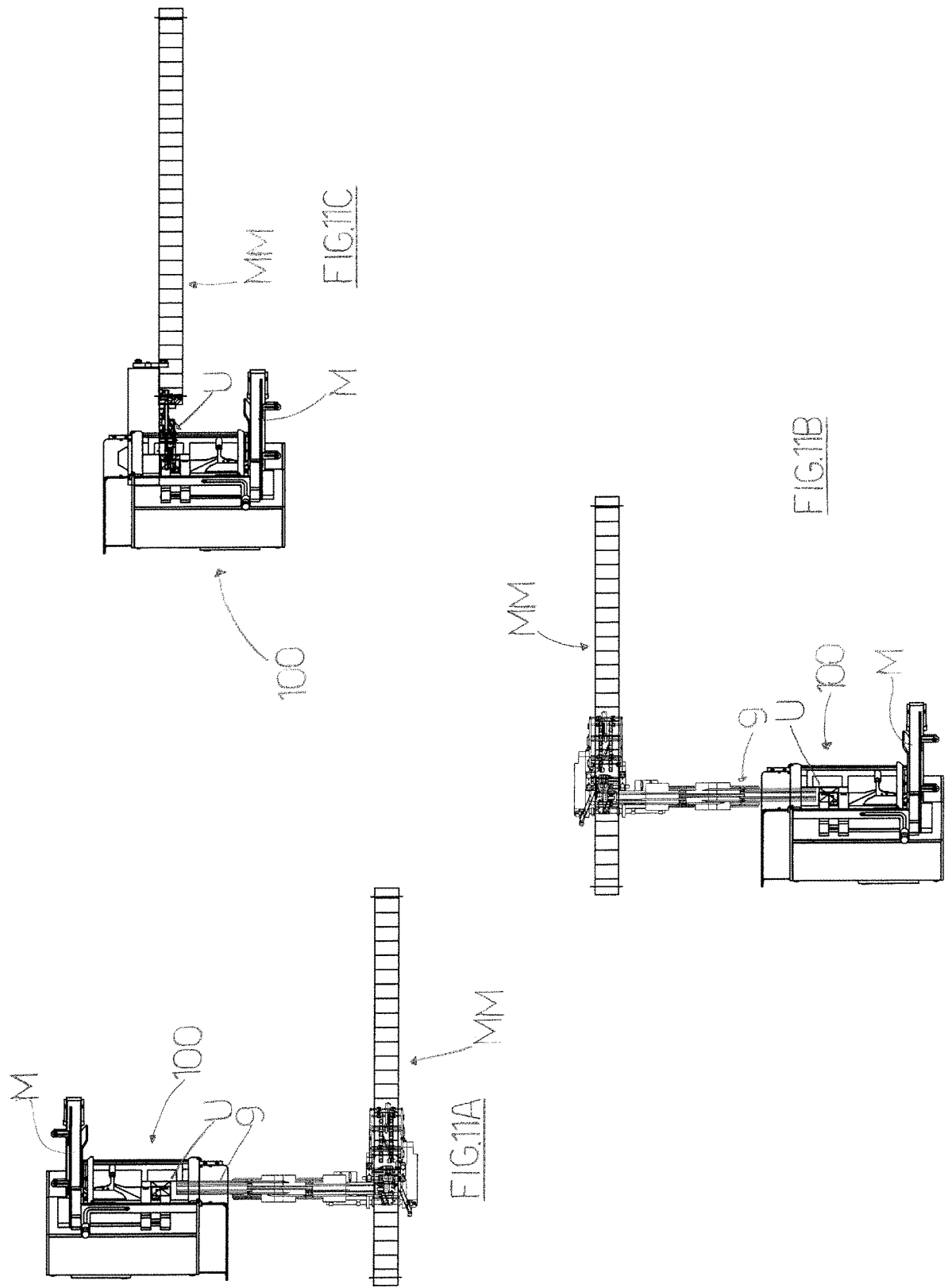

APPARATUS FOR EXTRACTING STACKED ARTICLES FROM A CARDBOARD CONTAINER

FIELD OF THE INVENTION

The present invention relates to an apparatus in order to extract stacked articles from a cardboard container and transfer the extracted articles to a packaging machine, such as for example a boxing machine which is to pack various types of articles internally of a box.

DESCRIPTION OF THE PRIOR ART

At present a known method is packaging several different articles in a single box, such as for example a blister pack containing pharmaceutical products (such as tables, capsules, pills) and an information sheet on which the information relating the main active ingredient present in the pharmaceutical product is contained, as well as the administering instructions, any eventual side-effects and undesired effects, and so on.

The information sheets are contained, stacked on one another, inside the cardboard containers, which have an elongate box shape, having an end or bottom that is closed by a folded tab and connected to a side of the container.

The sheets (articles) stacked an contained in the cardboard containers must then be extracted from the cardboard container and fed to the boxing machine.

The boxing machine operates at high velocity, and it is therefore necessary to extract the articles (information sheets) from the cardboard container and feed the extracted articles to the boxing machine with a high infeed frequency, or in any case at a speed that does not require a slowing down of the boxing machine and therefore does not have an effect on the productivity thereof.

Further, the elongate shape of the cardboard containers makes it difficult to handle and move, and therefore the operations of opening the bottom of the container and the extraction of the information sheets can be not always easy and rapid.

SUMMARY OF THE INVENTION

An aim of the present invention is therefore to provide an apparatus for extracting stacked articles from a cardboard container and in order to transfer the articles to a packaging machine able to carry out the extraction of the articles rapidly and efficiently, and therefore able to feed the articles to a packaging machine with a high infeed frequency, so as not to have a negative effect on the productivity of the packaging machine.

The above aim is attained by an apparatus for extracting stacked articles from a cardboard container in accordance with claim 1.

Other advantageous characteristics of the apparatus for extracting stacked articles from a cardboard container of the present invention are set down in the various dependent claims.

BRIEF DESCRIPTION OF THE DRAWINGS

The characteristics of a preferred but not exclusive embodiment of the apparatus for extracting stacked articles from a cardboard container are described in the following with reference to the accompanying tables of drawings in which:

FIG. 1 schematically illustrates, in a perspective view, the apparatus of the invention and a series of cardboard containers, having elongate shape, having a bottom closed by a tab folded and connected to a side of the container and internally of which other articles (not visible) are stacked on one another, which articles are to be extracted and then transferred to a packaging machine (not illustrated);

Figure 8B:
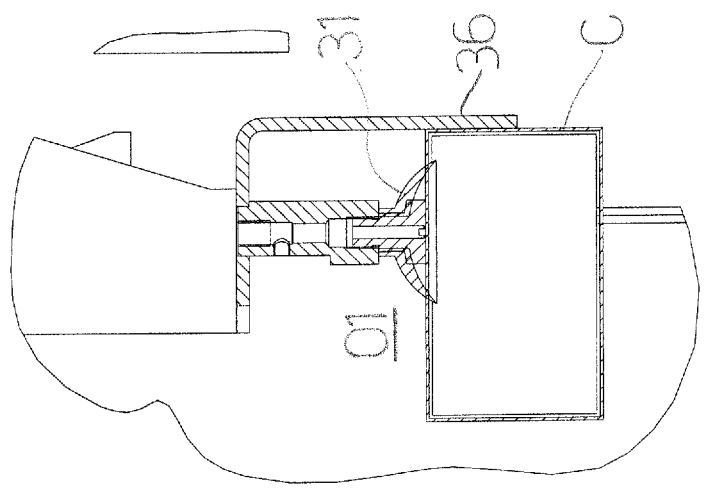
Figure 8A:
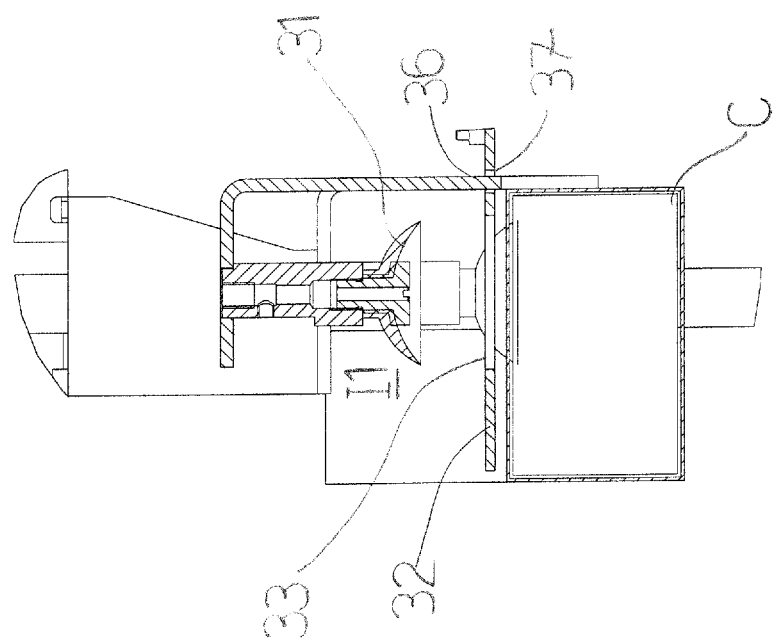
Figure 9B:
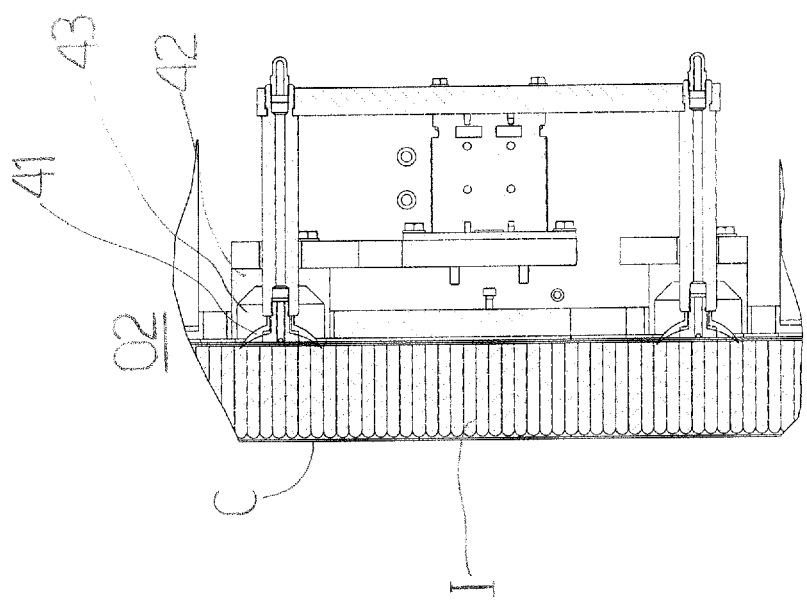
Figure 9A:
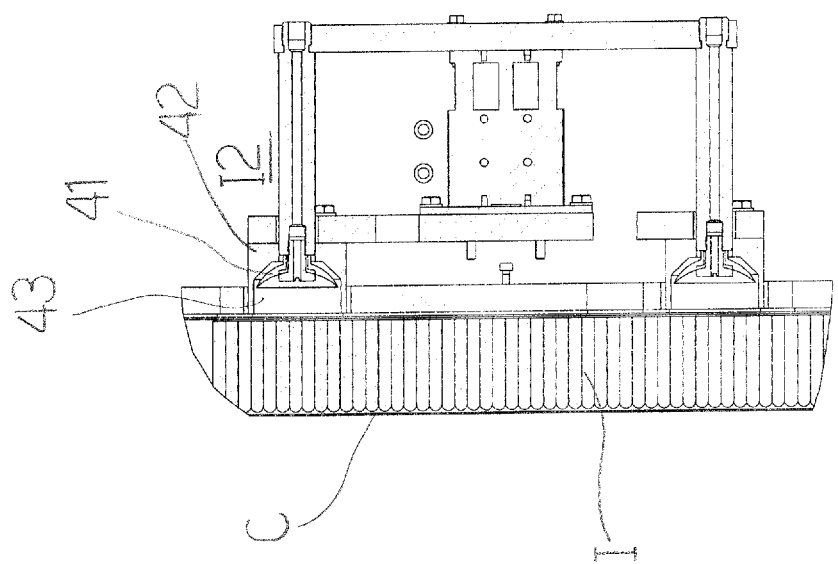

FIGS. from 6A to 6E illustrated, in relative perspective views, an operating sequence of the apparatus of the invention for extraction of articles from a series of cardboard containers;

FIGS. from 7A to 7D illustrate, in schematic perspective views, with some parts removed, the configurations that some significant components of the apparatus can assume in order to carry out the operating sequence shown in FIGS. from 6A to 6E;

FIGS. 8A and 8B represent partial views in transversal section of some significant components of the apparatus, illustrated in two distinct possible operating configurations;

FIGS. 9A and 9B represent partial views in transversal section of other significant components of the apparatus, illustrated in two distinct possible operating configurations;

FIGS. from 10A to 10F illustrated, according to partial cross-sectioned views, the operating sequence of exit of the articles from a relative cardboard container;

FIGS. 11A to 11C illustrated, in schematic plan views, the possible installation positions of the apparatus of the invention with respect to a line of a packaging machine, for example a boxing machine, to which the articles extracted from the cardboard containers must be transferred and supplied;

DESCRIPTION OF THE PREFERRED EMBODIMENTS

With reference to the appended tables of drawings, reference numeral (100) denotes the apparatus for extracting stacked articles (I) from a cardboard container (C), and for transferring and supplying the extracted articles to a packaging machine, for example a boxing machine (denoted schematically with reference (MM) in FIGS. from 11A to 11C), proposed by the present invention in its entirety.

The apparatus (100) comprises a store (M) for receiving cardboard containers (C) having an elongate box shape and conformed in such a way as to comprise a bottom closed by a tab (L) and containing internally thereof articles (I) stacked on one another, and a rest and sliding plane (1), substantially vertical and arranged transversally of the store (M).

The store (M) is configured in such a way as to receive the cardboard containers (C) arranged in a line, flanked one following another and wherein the cardboard containers (C) are arranged with the bottom thereof closed by the tab (L) facing downwards.

The store (M) and the rest and sliding plane (1) are reciprocally arranged in such a way that a first cardboard container (A) of the line of cardboard containers (C) present in the store (M) is resting on a relative lateral face on the rest and sliding plane (1) in a first pick-up position (P1) with respect to the rest and sliding plane (1) (see for example FIG. 1).

The apparatus (100) further comprises (see again, for example, FIG. 1):

an unloading channel (U) for unloading the articles (I) contained internally of the cardboard containers (C), arranged in a second unloading position (P2) with respect to the rest and sliding plane (1), laterally and inferiorly of the rest and sliding plane (1) and distant from the first pick-up position (P1);

an abutting plane (2), substantially horizontal and transversal to the rest and sliding plane (1) and arranged laterally to the store (M) between the first pick-up position (P1) and the unloading channel (U) and having an opening (20) at the inlet of the unloading channel (U);

abutting and folding means (21), for abutting and folding the tab (L) which closes the bottom of the cardboard containers (C), arranged laterally to the store (M) in proximity of the first pick-up position (P1) and configured to abut the tab (L) and fold the tab (L) with respect to the cardboard containers (C).

Figure 4:
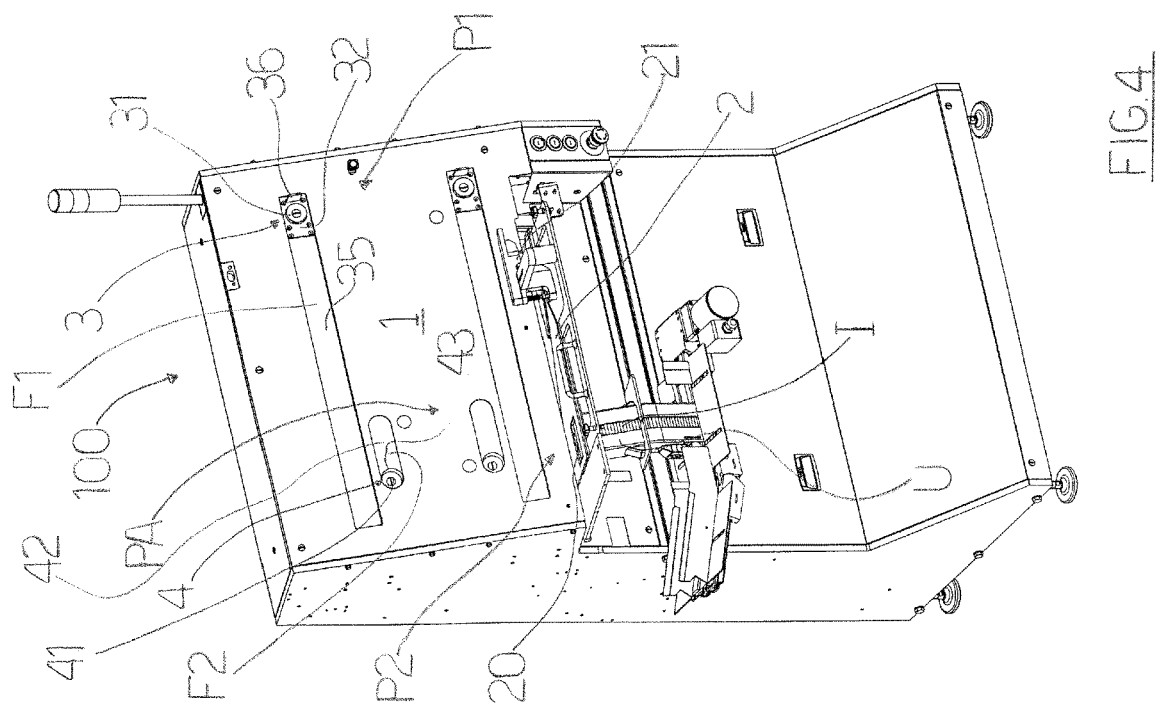
FIG. 4 illustrates the apparatus of the invention according to the view of FIG. 1 with some parts removed in order to better evidence some special components thereof.

The apparatus (100) further comprises a first suction pick-up and transfer group (3) and a second suction pick-up and transfer group (4) (see for example FIG. 4).

Figure 6C:
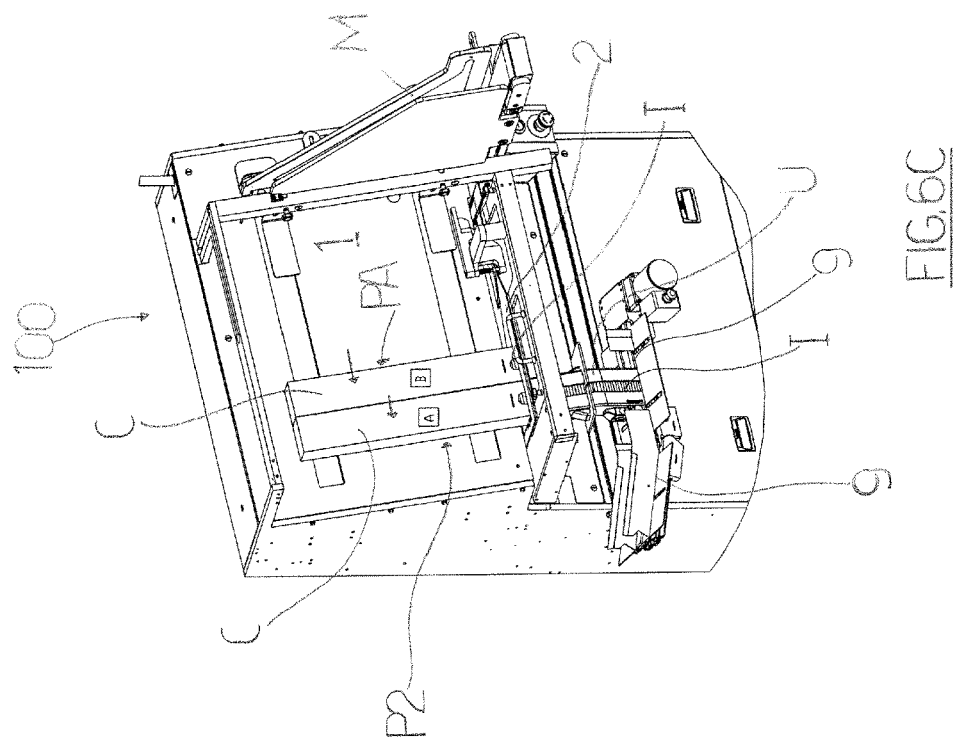
Figure 6B:
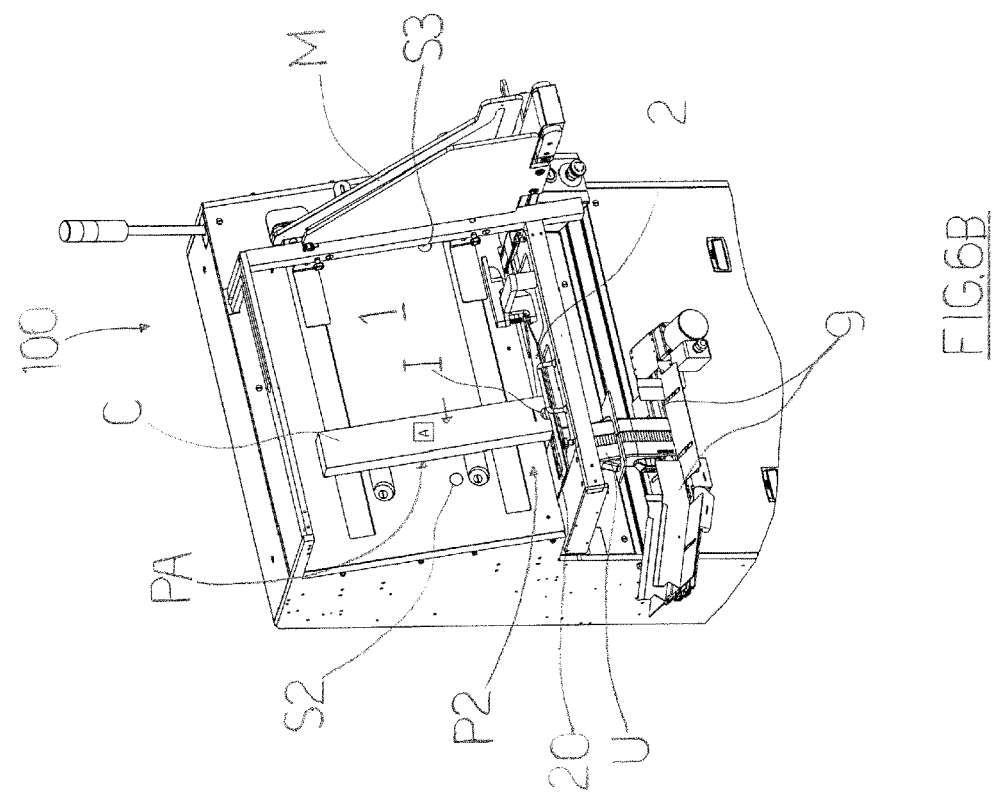
Figure 7A:
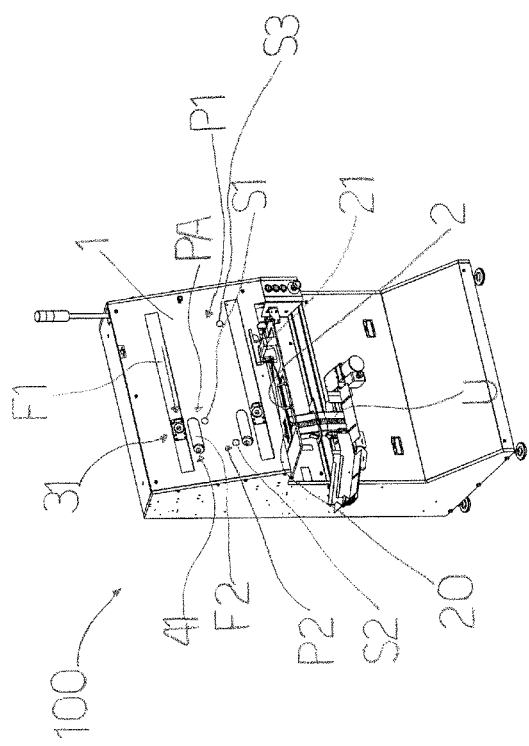

In particular, the apparatus (100) is such that the first suction pick-up and transfer group (3) is configured and predisposed in such a way as to be activatable and movable with respect to the rest and sliding plane (1) so as to abut and retain by suction the lateral face of a cardboard container (C) which is located in the store (M) in the first pick-up position (P1), resting on the rest and sliding plane (1), and to transfer the cardboard container (C), by sliding the container along the rest and sliding plane (1) on the lateral face, into a waiting position (PA) flanked to the opening (20) of the abutting plane (2) and therefore flanked to the inlet of the unloading channel (U) so that, during the transfer of the cardboard container (C), the abutting and folding means (21) abut a portion of the tab (L) so as to fold the tab (L) with respect to the cardboard container (C) in order to open the bottom of the cardboard container (C) and the abutting plane (2) maintains the articles (I) inside the cardboard container (C), preventing the articles (I) from falling (see for example FIGS. 6A and 6B and FIG. 7A).

Figure 7B:
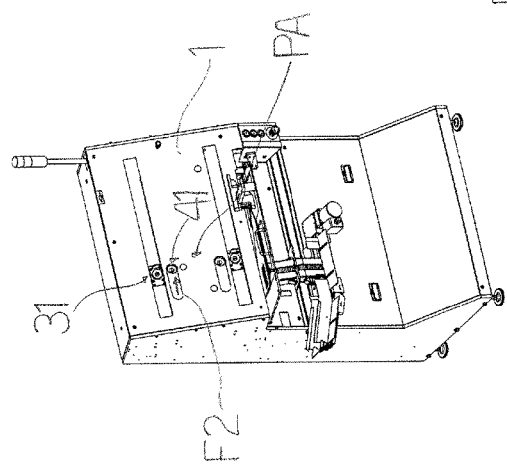
Figure 7C:
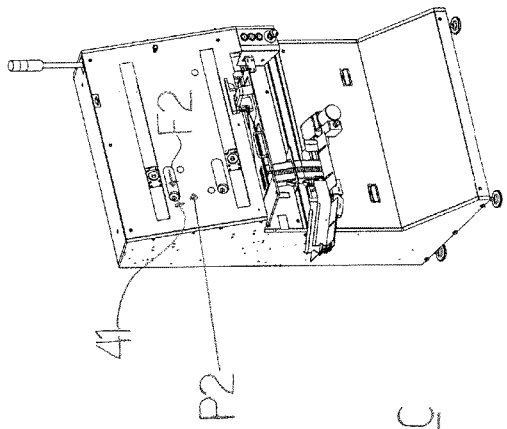

Further, the apparatus (100) is such that the second suction pick-up and transfer group (4) is configured and predisposed in such a way, once the first group (3) has positioned the cardboard container (C) in the waiting position (PA), as to be activatable and movable with respect to the rest and sliding plane (1) so as to abut and retain by suction the lateral face of the cardboard container (C) in the waiting position (PA), resting on the rest and sliding plane (1) and, following the deactivation of the first group (3), transferring the cardboard container (C) with the bottom open, sliding the container along the rest and sliding plane (1) on the lateral face thereof, from the waiting position (PA) to the second unloading position (P2) at the unloading channel (U) in such a way that the open bottom is at the opening (20) of the abutting plane (2) and at the inlet of the unloading channel (U) so that the articles (I) contained therein can fall by gravity in the unloading channel (U) and are then extracted from the cardboard container (C) in order to be transferred to a packaging machine (see for example FIG. 6C and FIGS. 7B and 7C).

Owing to these characteristics, the apparatus of the invention rapidly transfers each cardboard container present in the store into the first pick-up position (P1), resting against the rest and sliding plane (1), by sliding thereof along the rest and sliding plane (1) up to becoming positioned in the second unloading position (P2) at the unloading channel (U).

The transfer of the cardboard container (C) advantageously takes place with the use of the first suction pick-up and transfer group (3) and a second suction pick-up and transfer group (4), which cooperate with one another.

The first group (3) performs the transfer of the cardboard container (C) from the first pick-up position (P1) to the waiting position (PA), while the second group (4) carries out the transfer of the cardboard container (C) from the waiting position (PA) to the second unloading position (P2).

In this way, when waiting for all the articles present in the cardboard container (C), which has been positioned by the second group (4) in the second unloading position (P2), to exit from the cardboard container and fall into the unloading channel (U), then to be transferred to a packaging machine, the first group (3) can be activatable to return into the first pick-up position (P1) and transfer another cardboard container into the waiting position (PA).

Further, owing to the presence of the abutting means (21) and the abutting plane (2), along the transfer trajectory of the cardboard container from the first pick-up position (P1) to the waiting position (PA), it is possible, rapidly and effectively, to abut and fold the tab (L) which closes the bottom of the container so as to open the bottom and at the same time retain the articles (I) internally thereof up to when the cardboard container (C), with the bottom open, is transferred by the second group (4) to above the opening (20) of the abutting plane (2), in the second unloading position (P2) at the unloading channel (U).

Further and other characteristics of the apparatus of the invention are set down in the following.

The apparatus (100) is such that the rest and sliding plane (1) comprises: at least a first through-window (F1), parallel to the abutting plane (2) and having a length that is such as to extend at least between the first pick-up position (P1) and the waiting position (PA), and at least a second through-window (F2), parallel to the first through-window (F1) and to the abutting plane (2), which is arranged, and has a length that is such, as to extend between the waiting position (PA) and the second unloading position (P2) (see for example FIG. 4).

Further, the apparatus (100) is such that the first suction pick-up and transfer group (3) comprises at least a relative suction gripping element (31) configured and predisposed in such a way as to be able to assume two distinct configurations with respect to the first through-window (F1) and to the rest and sliding plane (1): a first non-operative configuration (I1) in which the suction gripping element (31) is in a retracted position with respect to the first through-window (F1) and to the rest and sliding plane (1), and a second operative configuration (O1), wherein the suction gripping element (31) is in an advanced position with respect to the first through-window (F1) so as to project beyond the first through-window (F1) and from the rest and sliding plane (1) in order to be able to abut and retain by suction the face of a cardboard container (C) resting against the rest and sliding plane (1) (see for example in particular FIGS. 8A and 8B).

Further, the suction gripping element (31) is further configured and predisposed to be movable along the first through-window (F1), from the pick-up position (P1) to the waiting position (PA), and vice versa, so that the suction gripping element (31), when positioned at the pick-up position (P1) and located in the second operative configuration (O1) can abut and retain by suction the face of a cardboard container (C) and thus be movable along the first through-window (F1) to transfer the cardboard container (C) from the first pick-up position (P1) to the waiting position (PA) (see for example FIG. 4 and FIGS. from 7A to 7D).

Further, the apparatus (100) is such that the second suction pick-up and transfer group (4) comprises at least a relative suction gripping element (41) configured and predisposed in such a way as to be able to assume two distinct configurations with respect to the second through-window (F2) and to the rest and sliding plane (1): a first non-operative configuration (I2) in which the suction gripping element (41) is in a retracted position with respect to the second through-window (F2) and to the rest and sliding plane (1), and a second operative configuration (O2), in which the suction gripping element (41) is in an advanced position with respect to the second through-window (F2) so as to project beyond the second through-window (F2) and from the rest and sliding plane (1) in order to be able to abut and retain by suction the face of a cardboard container (C) in the waiting position (PA) resting against the rest and sliding plane (1) (see for example FIGS. 9A and 9B).

Further, the suction gripping element (41) being further configured and predisposed to be movable along the second through-window (F2), from the waiting position (PA) to the second unloading position (P2), and vice versa, so that the suction gripping element (41), when positioned at the waiting position (PA) and located in the second operative configuration (O2) can abut and retain by suction the face of a cardboard container (C) brought into the waiting position (PA) by the suction gripping element (31) of the first group (3) and thus, once the suction gripping element (31) of the first group (3) is brought into the relative first non-operative configuration (I1) to release the cardboard container (C), can be movable along the second through-window (F2) to transfer the cardboard container (C) from the waiting position (PA) to the second unloading position (P2) so that the articles (I) contained therein can fall by gravity into the unloading channel (U) through the opening (20) of the abutting plane (2) (see for example FIGS. 7B and 7C).

Figure 3:
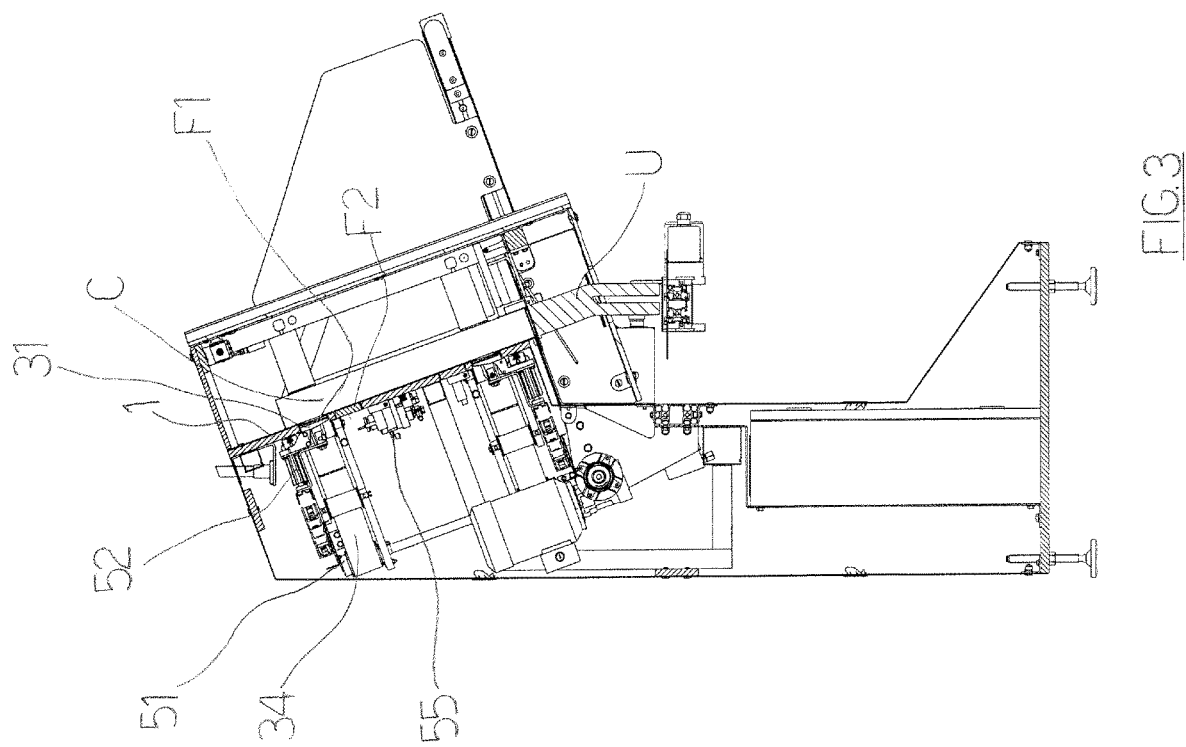
FIG. 3 is the view along section plane I-I of FIG. 2.
Figure 2:
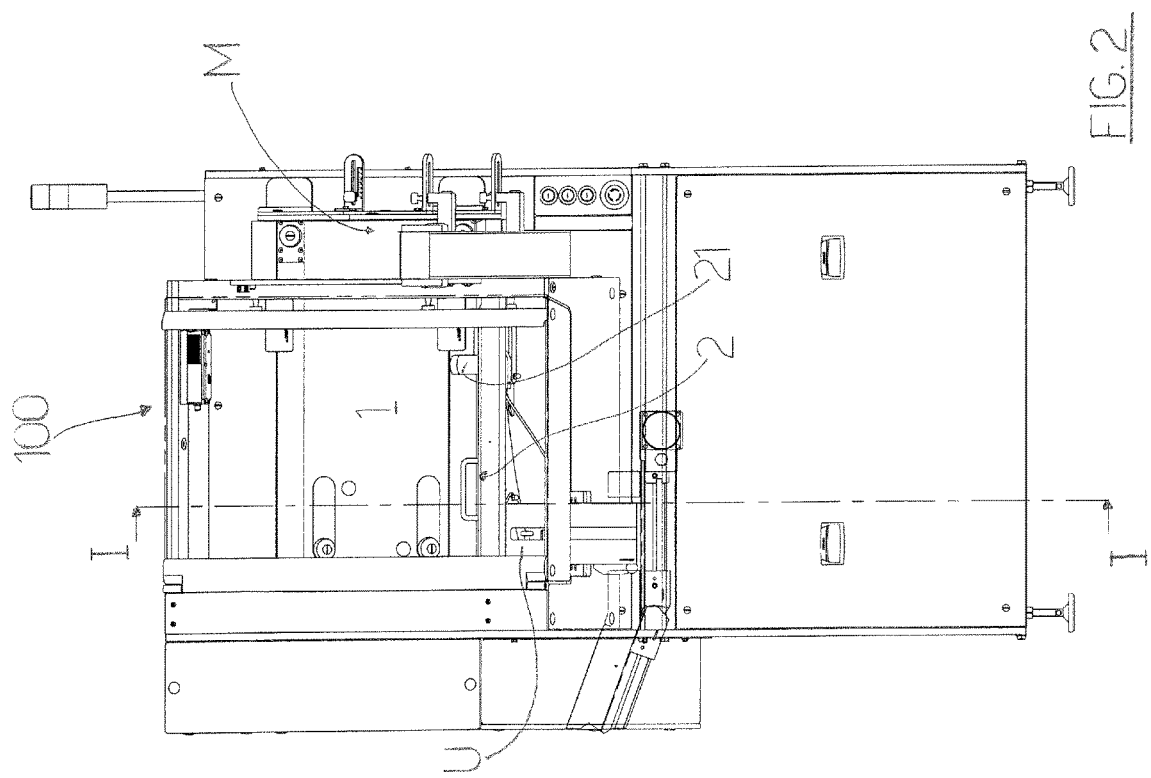
FIG. 2 is a front view of the apparatus of FIG. 1.
Figure 5:
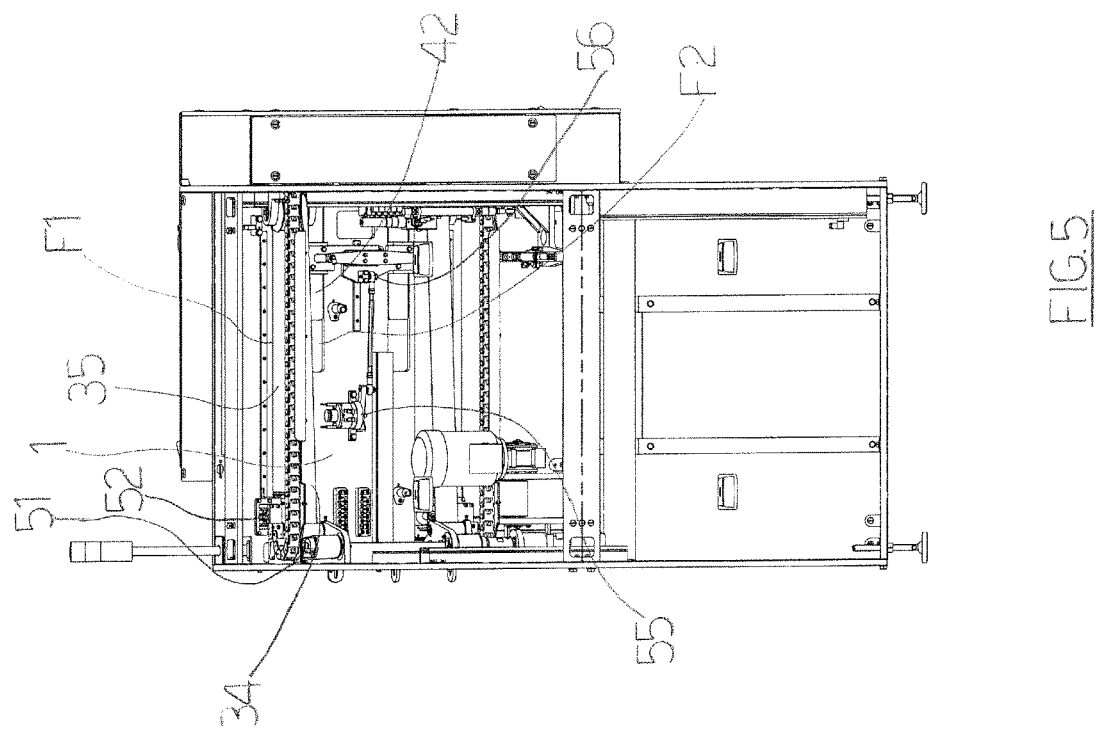
FIG. 5 is a rear view of the apparatus of FIG. 1.

In particular, the first suction pick-up and transfer group (3) comprises a belt (34) loop-wound so as to comprise a straight branch (35) arranged along the first through-window (F1) and a plate (32) provided with a through-hole (33) mounted on the straight branch (35), and with the suction gripping element (31) of the first group (3) borne by the plate (32) so as to be movable with respect to the plate (32) and to pass through the through-hole (33) so as to be positionable in the relative first non-operative configuration (I1) and in the relative second operative configuration (O1) (see for example FIGS. 3, 4, 5).

Figure 7D:
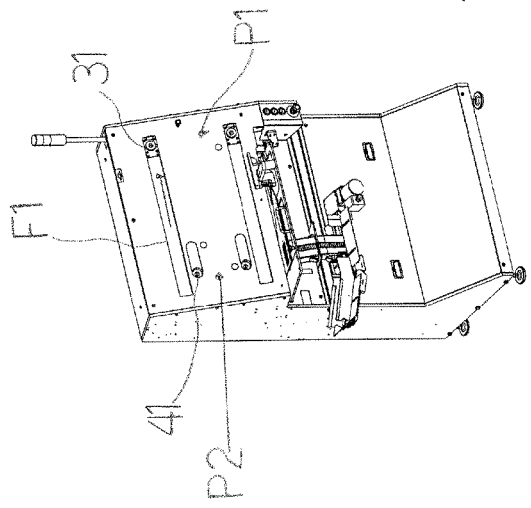

The belt (34) is activatable in two opposite movement directions so that the straight branch (35) is movable in the first through-window (F1) in a first movement direction, so that the plate (32), and thus the suction gripping element (31) of the first group (3), can be movable from the first pick-up position (P1) to the waiting position (PA) (FIG. 7A), and in a second movement direction opposite the first movement direction so that the plate (32), and thus the suction gripping element (31), can be movable from the waiting position (PA) to the first pick-up position (P1) (FIG. 7D).

Further, the first group (3) comprises a lateral abutting wall (36) coupled to the suction gripping element (31) while the plate (32) comprises a through-slot (37) for passage of the lateral abutting wall (36).

The lateral abutting wall (36) being movable together with the suction gripping element (31) with respect to the plate (32) so as to cross the through-slot (37) and assume a projecting position from the rest and sliding plane (1), when the suction gripping element (31) is located in the relative second operative configuration (O1), so as to abut a lateral face of the cardboard container perpendicular to the rest and sliding plane (1), and upstream with respect to the unloading channel (U), and accompany the cardboard container (C) during transfer thereof from the first pick-up position (P1) to the waiting position (A) by means of the suction gripping element (31) (see for example FIG. 8B).

The apparatus (100) further comprises first activating means (51) predisposed for activating the belt (34) and second activating means (52) predisposed for moving the suction gripping element (31) of the first group (3), and the lateral abutting wall (36), with respect to the plate (32), and positioning the suction gripping element (31) in the relative first non-operative configuration (I1) and second operative configuration (O1) (see for example FIGS. 3 and 5).

For example, the first activating means (51) can comprise pulleys, on which the belt (34) is wound and a motor organ is arranged to activate at least one of pulleys in rotation, while the second activating means (52) can comprise a pusher member, to displace the suction gripping element (31) and the lateral abutting wall (36) with respect to the plate (32), and a chain for moving the pusher member so that it follows the movement of the belt (34).

In turn, the second suction pick-up and transfer group (4) comprises a slide (42) arranged posteriorly to the rest and sliding plane (1) at the second through-window (F2) (see for example FIGS. 4 and 5).

The slide (42) comprises a through-hole (43) with the suction gripping element (41) of the second group (4) being borne by the slide (42) so as to be movable with respect to the slide (42) and to pass through the through-hole (43) of the slide (42) so as to be positionable in the relative first non-operative configuration (I2) and in the relative second operative configuration (O2) (see for example FIGS. 9A and 9B).

The slide (42) is activatable in translation with respect to the rest and sliding plane (1) and with respect to the second through-window (F2) in two opposite translation directions so that the suction gripping element (41) of the second group (4) is movable with respect to the second through-window (F2) in a first translation direction, in order to be movable from the waiting position (PA) to the second unloading position (P2), and in a second translation direction, opposite the first translation direction, in order to be movable from the second unloading position (P2) to the waiting position (PA) (see FIGS. 7B and 7C).

The apparatus comprises third activating means (55), for translation activation of the slide (42) with respect to the second through-window (F2), and a movement group (56) for movement of the suction gripping element (41) of the second group (4) with respect to the slide (42) in order to position the suction gripping element (41) in the relative first non-operative configuration (I2) and second operative configuration (O2) (see for example FIGS. 3 and 5).

For example, the third activating means (55) can comprise a pneumatic actuator and the activating group can comprise a kinematic mechanism with a series of levers hinged to one another which is activated by the pneumatic actuator for translation of the slide and for the movement of the suction gripping element (41) of the second group (4).

The apparatus (100) is further provided with first sensor means (S1) arranged on the rest and sliding plane (1) at the waiting position (PA), and second sensor means (S2)

arranged on the rest and sliding plane (1) at the second unloading position (P2) (see for example FIGS. from 7A to 7D).

In particular, the first sensor means (S1) are configured in such a way as to detect a positioning of a cardboard container (C), by the first suction pick-up and transfer group (3), in the waiting position (PA) (FIG. 6B and FIG. 7A), so that the second suction pick-up and transfer group (4) can be activated in order to be positioned in the waiting position (PA) (FIG. 7B) to abut and retain by suction the cardboard container (C), and carry out the subsequent transfer thereof into the second unloading position (P2) (FIG. 6C and FIG. 7C) once the first group (3) has released the grip on the cardboard container (C).

The second sensor means (S2) are configured in such a way as to detect a positioning of a cardboard container (C), by the second suction pick-up and transfer group (4), in the second unloading position (P2), so that the first suction pick-up and transfer group (3) can be moved to return into the first pick-up position (P1) in order to transfer a subsequent cardboard container (C) from the first pick-up position (P1) to the waiting position (PA) (see for example FIG. 7D).

The apparatus (100) further comprises third sensor means (S3) which are arranged on the rest and sliding plane (1) at the first pick-up position (P1).

The third sensor means (S3) are configured so as to detect the presence of a cardboard container resting on the rest and sliding plane (1), which circumstance enables having an item of information with respect to the fact that there are still cardboard containers (C) to be emptied in the store, and thus to be able to move the first gripping and transfer group (3) and return it to the first pick-up position (P1), once a preceding container has been released in the waiting position (PA).

Figure 10B:
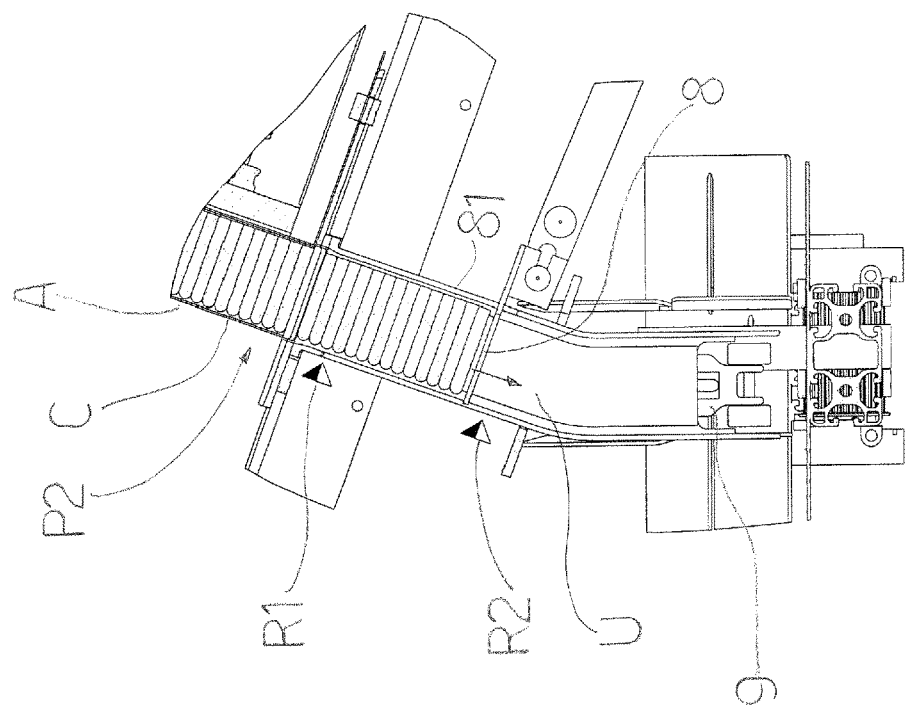
Figure 10A:
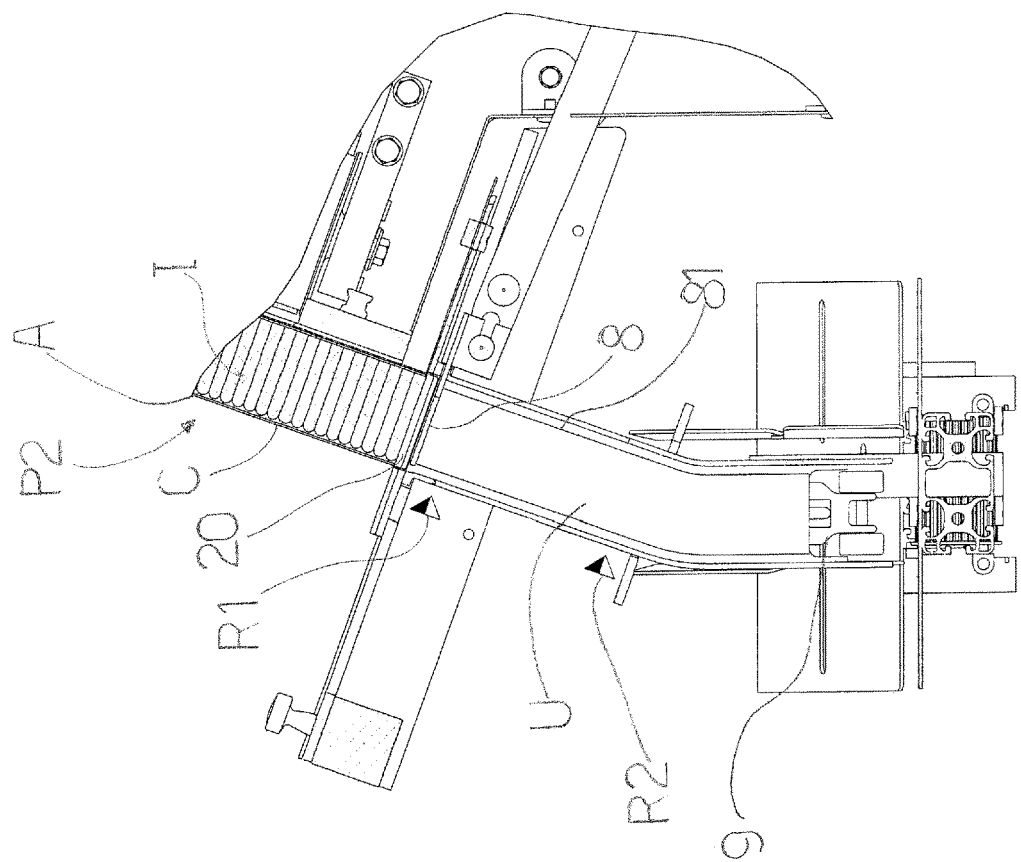

A further advantageous aspect of the apparatus (100) relates to the fact that it comprises an article accompanying plate (8) predisposed and configured in such a way as to be movable with respect to the unloading channel (U) so as to be positionable externally of the unloading channel (U) and internally of the unloading channel (U), through a relative passage slot (81), in proximity of the relative inlet so as to intercept and support the articles (I) falling from the open bottom of the cardboard container (C) positioned in the second unloading position (P2) (see for example FIG. 10A).

The article accompanying plate (8), once positioned internally of the unloading channel (U) in proximity of the inlet of the unloading channel (U) in order to intercept the articles (I) falling from the open bottom of the cardboard container (C), being movable downwards with respect to the unloading channel (U) so as to accompany the articles (I) for a portion internally of the unloading channel (U) and then be retractile with respect to the unloading channel (U) in such a way as to release the articles (I) and cause the articles (I) to descend freely down to the outlet of the unloading channel (U), and then be newly raised to be activated to intercept the articles (I) of a successive cardboard container located in the second unloading position (P2) (see FIGS. from 10B to 10D).

To activate the movement of the plate (8), the apparatus (100) comprises a first detecting means (R1) predisposed in such a way as to detect the presence or not of articles (I) at the inlet of the unloading channel (U) and a second detecting means (R2), for example a photocell, arranged inferiorly of the first detecting means (R1), arranged to detect the presence or not of articles (I) internally of the unloading channel (U).

When the cardboard container (C), with the bottom open, is transferred by the second group (4) in the second unloading position (P2), at the opening (20) of the abutting plane (2), the plate (8) is inserted in the unloading channel (U) in proximity of the relative inlet (situation illustrated in FIG. 10A), to support the articles (I) present in the cardboard container (C).

Figure 10D:
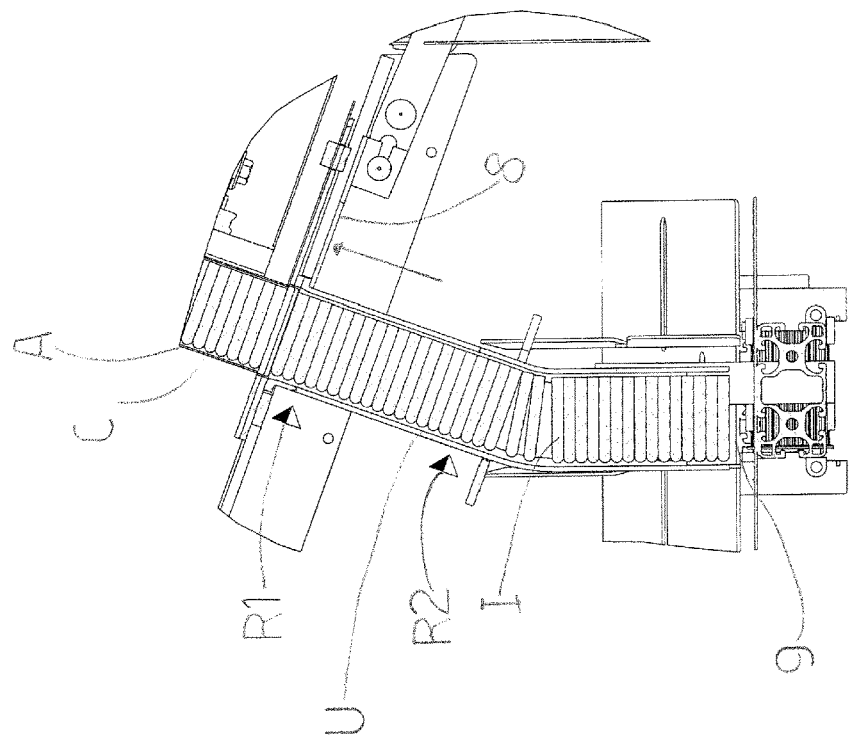
Figure 10C:
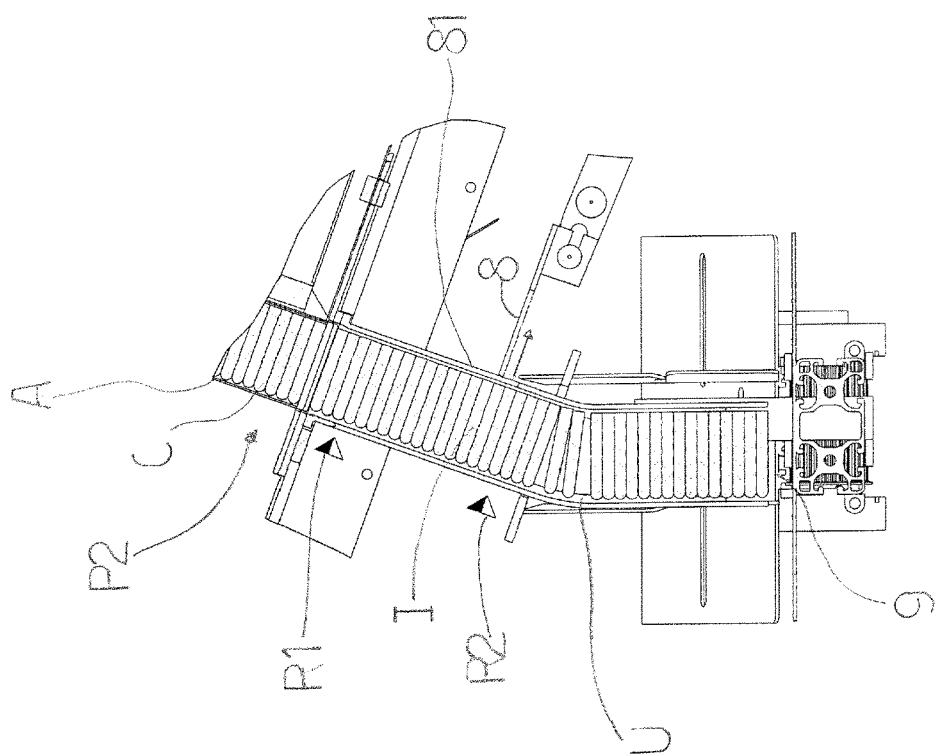

The plate (8) is then moved downwards, remaining inside the unloading channel (U) to accompany the fall of the articles (I) internally of the same unloading channel (U) for a certain portion (FIGS. 10B and 10C).

The plate (8) is then retracted and extracted from the unloading channel (U), allowing the articles (I) to fall freely for the final portion of the unloading channel (U), in order then to be newly raised and be positioned, externally of the unloading channel (U), in proximity of the relative inlet (FIGS. 10C and 10D).

The plate (8) remains in this position (FIG. 10D) as long as the first detecting means (R1) detects the presence of articles (I) in the unloading channel (U), which means that the cardboard container (C) in the second unloading position (P2) has not yet been completely emptied.

As soon as the first detecting means (R1) detects the absence of articles in the inlet of the unloading channel (U), which means that the cardboard container (C) in the second unloading position (P2) has been completely emptied, the plate (8) is newly moved to be inserted in the unloading channel (U) in proximity of the relative inlet (FIG. 10E), so as to be ready to support the articles of a successive cardboard container which will be positioned in the second unloading position (P2).

Figure 10F:
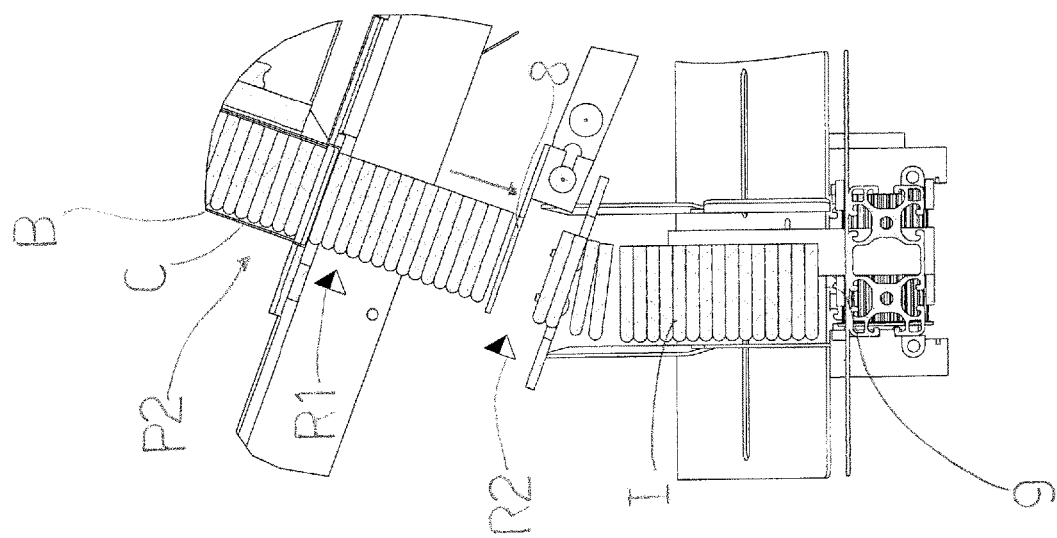
Figure 10E:
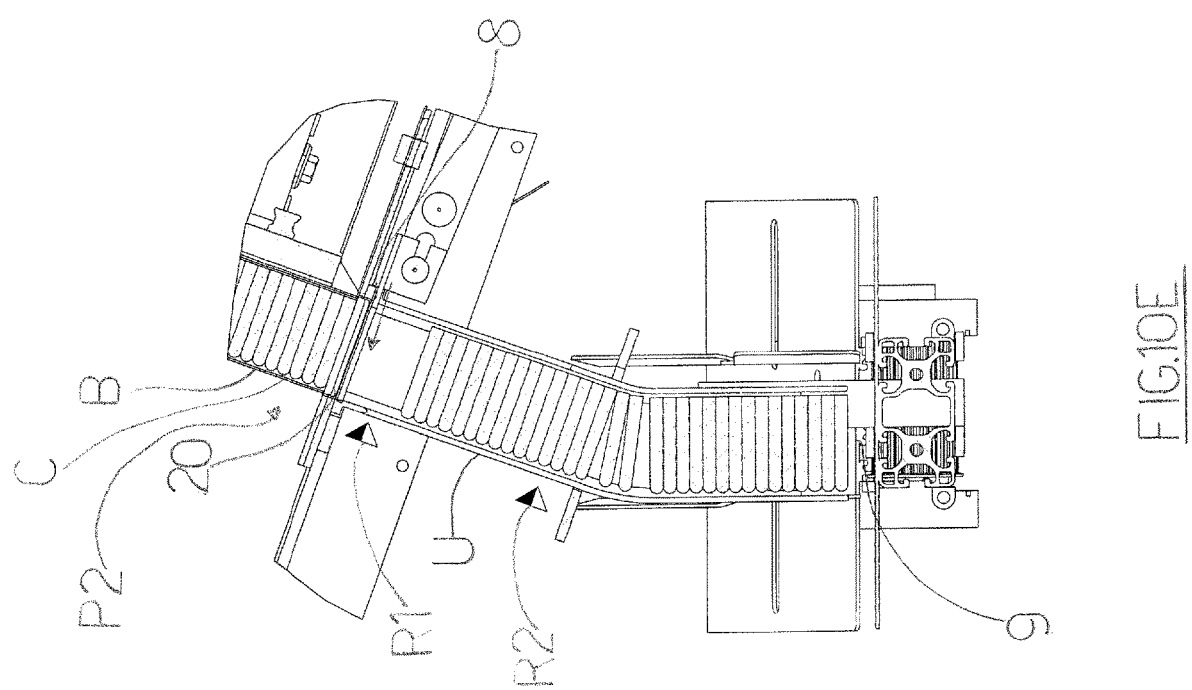

As soon as the second detecting means (R2) which, as mentioned, is arranged inferiorly of the first detecting means (R1) along the unloading channel (U), detects the absence of articles in the unloading channel (which means that all the articles of the preceding cardboard container have already exited the unloading channel), the plate (8) is newly moved downwards to accompany the articles of the successive cardboard container positioned in the second unloading position (P2) internally of the unloading channel, in order to empty it (FIG. 10F).

Lastly, the apparatus (100) comprises a conveyor means (9) predisposed at the outlet of the unloading channel (U) and such as to receive the articles (I) exiting from the unloading channel (U), the conveyor means (9) being activatable to transfer the articles received from the unloading channel (U) towards a packaging machine (MM).

The apparatus (100) is designed and configured in such a way as to be adapted with the purpose of being associable to the packaging machine (MM), for example a boxing machine, according to various possible solutions.

In fact, according to the reciprocal positioning of the store (M), of the rest and sliding plane (1) with the relative first and second window (F1, F2), of the unloading channel (U), of the abutting plane (2) with the relative opening (20), of the abutting means (21), and of the conveyor means (9), it is possible to position the apparatus (100) on a first or second side of the packaging machine (MM) (see FIGS. 11A and 11B).

Further, if the conveyor means (9) is not present, it is possible to install and position the apparatus (100) directly on the line of the packaging machine (MM), as illustrated in FIG. 11C.

The following is a description of a possible operating sequence of the apparatus (100) of the invention, taking as an initial situation the one illustrated in FIG. 1, in which a group of the cardboard containers (C) has been predisposed in the store (M), in a line with one flanked to another and with the bottom closed by the tab (L) facing downwards and so that a first container (A) is resting with a relative lateral face on the rest and sliding plane (1) at the first pick-up position (P1).

The third sensor means (S3) detect the presence of a cardboard container resting on the rest and sliding plane (1) at the first pick-up position (P1).

The suction gripping element (31) of the first group (3) is in the relative first non-operative configuration (I1) (FIG. 8A) and is moved by the belt (34) with respect to the first through-window (F1) in order to be positioned in the first pick-up position (P1) (FIG. 4), and then brought into the second operative configuration (O1) (FIG. 8B), passing through the first through-window (F1), so as to abut and retain by suction the lateral face of the first container (C) which is located against the rest and sliding plane (1).

The suction gripping element (31), maintained in the second operative configuration (O1), is then translated along the first through-window (F1) (by movement del belt (34)) to transfer the first container (A), by sliding it along the rest and sliding plane (1), up to positioning it in the waiting position (PA) (FIGS. 6A, 6b, 7A).

During this transfer, the abutting and folding means (21) encounter and fold the tab (L), thus opening the bottom of the first container (A); the abutting plane (2) will treat the articles present internally of the container, preventing exit thereof through the open bottom.

The first sensor means (S1) detect the arrival and positioning of the first container (A) in the waiting position (PA), and then the suction gripping element (41) of the second group (4), located in the relative first non-operative configuration (I2) (FIG. 9A), is made to translate with respect to the second through-window (F2) (by translation of the slide (42) along the second through-window (F2)) up to positioning it at the waiting position (PA) (FIG. 7B), and then brought into the relative second operative configuration (O2) (FIG. 9B) to abut and retain the face of the first container (A) by suction.

The first suction gripping element (31) of the first group (3) is then returned into the relative first non-operative configuration (I1), in a retracted position with respect to the first through-window (F1), thus releasing the grip on the first container (A).

And then the suction gripping element (41) of the second group (4), located in the second through-window (F2) so as to translate the first container (A) up to positioning it in the second unloading position (P2) (FIGS. 6C, 7C) above the opening (20) of the abutting plane (2) at the unloading channel (U).

The plate (8), positioned internally of the unloading channel (U) unloading channel in proximity of the relative inlet, will treat the articles (I) present in the first container (A) (FIG. 10).

Once the second sensor means (S2) detect the positioning of the first container (A) in the second unloading position (P2), the suction gripping element (31) of the first group (3) can be moved with respect to the first window (F1) in order to return into the first pick-up position (P1) (FIG. 7D) and then can be returned into the second operative configuration (O1) to abut and retain by suction the lateral face of a second container (B) resting against the rest and sliding plane (1), and then can transfer it into the waiting position (PA), with a contemporary opening of the relative bottom (FIG. 6C).

In the meantime, the plate (8) will be moved downwards to accompany the fall of the articles (I) present in the first container (A) into the unloading channel (U) (FIG. 10B) and then will be retracted from the unloading channel (U) in order to free the articles (I) to fall further along the unloading channel (U); the conveyor means (9) will carry the articles in outlet from the unloading channel towards the packaging machine (MM).

When the first detecting means (R1) detects that there are no more articles (I) falling in proximity of the inlet to the unloading channel (FIG. 10E) (a circumstance which, as mentioned herein above, indicates that all the articles have been extracted from the first cardboard container (A)), the plate (8) is newly returned internally of the unloading channel (U) while the suction gripping element (41) of the second group (4), once brought into the first non-operative configuration (I2), is moved with respect to the second window (F2) in order to be newly positioned in the waiting position (PA) and then returned into the second operative configuration (O2) to abut and retain by suction the lateral face of a second container (B) located in the waiting position (PA).

As soon as the suction gripping element (31) of the first group (3) is returned into the first non-operative configuration (I1), the suction gripping element (4) of the second group (4) is translated along the second window (F2) in order to bring and position the second container (B) in the second unloading position (P2) (FIG. 6D).

The positioning of the second container (B) in the second unloading position (P2) will lead to the displacement of the first container (A), already emptied, laterally on an outlet shelf.

The plate (8), after the second detecting means (R2) detects the absence of articles at a certain depth of the unloading channel (FIG. 10F), will then be activated according to the operating cycle thereof described previously (and illustrated in FIGS. from 10A to 10F).

In the meantime, the gripping element (31) of the first group (3) will be activated so as to pick up and transfer a third cardboard container (C) and position it in the waiting position (PA), awaiting the complete emptying of the second cardboard container (B) located in the second unloading position (P2) (FIG. 6D).

Once the second container (B) has been emptied, the gripping element (41) of the second group (4) will be activated as previously described so as to pick up and transfer the third cardboard container (C) from the waiting position (C) to the second unloading position (P2).

The positioning of the third container (C) in the second unloading position (P2) will lead to the lateral displacement of the second container (B) on the outlet shelf and the fall of the first container (A) from the outlet shelf to a collection store of the empty containers (not illustrated) (FIG. 6E).

According to the preferred embodiment illustrated in the figures, the apparatus (100) can be configured so that the rest and sliding plane (1) also comprises a third through-window, parallel to the first through-window (F1), and which extends at least from the first pick-up position (P1) to the waiting position (PA), and also a fourth through-window, parallel to the second through-window (F2) and which extends at least from the waiting position (PA) to the second pick-up position (P2).

In this case, the first suction pick-up and transfer group (3) will also comprise a second further suction gripping element predisposed to be translatable along the third window and positionable in a retracted configuration and advanced with respect to the third window and the rest and sliding plane.

For the movement of the second further gripping element of the first group (3), a second belt can be included, loop-wound with a relative straight branch arranged along the second window, and activatable in a corresponding way to the belt (34), with the relative straight portion (35) in the first window (F1).

In this way for the pick-up and transfer of the container along the rest and sliding plane there will be two suction gripping elements which retain the cardboard container by suction.

In the same way, the second suction pick-up and transfer group (4) will also comprise a second further suction gripping element predisposed to be movable and activatable along the second window in the same ways as the gripping element (41).

The invention claimed is:

1. An apparatus for extracting stacked articles from a cardboard container, comprising:
    a store for receiving cardboard containers having an elongate box shape and conformed in such a way as to comprise a bottom closed by a tab and containing internally thereof articles stacked on one another, the store being configured in such a way as to receive the cardboard containers arranged in a line, flanked one following another and wherein the cardboard containers are arranged with the bottom thereof closed by the tab facing downwards;
    a rest and sliding plane, substantially vertical and transversal to the store;
    wherein the store and the rest and sliding plane are reciprocally arranged in such a way that a first cardboard container of the line of cardboard containers present in the store is resting on a relative lateral face on the rest and sliding plane in a first pick-up position with respect to the rest and sliding plane;
    an unloading channel for unloading the articles contained internally of the cardboard containers, arranged in a second unloading position with respect to the rest and sliding plane, laterally and inferiorly of the rest and sliding plane and distant from the first pick-up position;
    an abutting plane, substantially horizontal and transversal to the rest and sliding plane and arranged laterally to the store between the first pick-up position and the unloading channel and having an opening at the inlet of the unloading channel;
    abutting and folding means, for abutting and folding the tab which closes the bottom of the cardboard containers, arranged laterally to the store in proximity of the first pick-up position and configured to abut the tab and fold the tab with respect to the cardboard containers;
    a first suction pick-up and transfer group;
    a second suction pick-up and transfer group;
    wherein the first suction pick-up and transfer group is configured and predisposed in such a way as to be activatable and movable with respect to the rest and sliding plane so as to abut and retain by suction the lateral face of a cardboard container which is located in the store in the first pick-up position, resting on the rest and sliding plane, and to transfer the cardboard container, by sliding the container along the rest and sliding plane on the lateral face, into a waiting position flanked to the opening of the abutting plane and therefore flanked to the inlet of the unloading channel so that, during the transfer of the cardboard container, the abutting and folding means abut a portion of the tab so as to fold the tab with respect to the cardboard container in order to open the bottom of the cardboard container and the abutting plane maintains the articles inside the cardboard container, preventing the articles from falling;
    wherein the second suction pick-up and transfer group is configured and predisposed in such a way, once the first group has positioned the cardboard container in the waiting position, as to be activatable and movable with respect to the rest and sliding plane so as to abut and retain by suction the lateral face of the cardboard container in the waiting position, resting on the rest and sliding plane and, following the deactivation of the first group, transferring the cardboard container with the bottom open, sliding the container along the rest and sliding plane on the lateral face thereof, from the waiting position to the second unloading position at the unloading channel in such a way that the open bottom is at the opening of the abutting plane and at the inlet of the unloading channel so that the articles contained therein can fall by gravity in the unloading channel and are then extracted from the cardboard container in order to be transferred to a packaging machine.

2. The apparatus of claim 1, wherein the rest and sliding plane comprises: at least a first through-window, parallel to the abutting plane and having a length that is such as to extend at least between the first pick-up position and the waiting position, and at least a second through-window, parallel to the first through-window and to the abutting plane, which is arranged, and has a length that is such, as to extend between the waiting position and the second unloading position,
    and wherein the first suction pick-up and transfer group comprises at least a relative suction gripping element configured and predisposed in such a way as to be able to assume two distinct configurations with respect to the first through-window and to the rest and sliding plane: a first non-operative configuration in which the suction gripping element is in a retracted position with respect to the first through-window and to the rest and sliding plane, and a second operative configuration in which the suction gripping element is in an advanced position with respect to the first through-window so as to project beyond the first through-window and from the rest and sliding plane in order to be able to abut and retain by suction the face of a cardboard container resting against the rest and sliding plane, the suction gripping element being further configured and predisposed to be movable along the first through-window, from the pick-up position to the waiting position, and vice versa, so that the suction gripping element, when positioned at the pick-up position and located in the second operative configuration can abut and retain by suction the face of a cardboard container and thus be movable along the first through-window to transfer the cardboard container from the first pick-up position to the waiting position,
    and wherein the second suction pick-up and transfer group comprises at least a relative suction gripping element configured and predisposed in such a way as to be able to assume two distinct configurations with respect to the second through-window and to the rest and sliding plane: a first non-operative configuration in which the suction gripping element is in a retracted position with respect to the second through-window and to the rest and sliding plane, and a second operative configuration in which the suction gripping element is in an advanced position with respect to the second through-window in order to project beyond the second through-window and from the rest and sliding plane to be able to abut and retain by suction the face of a cardboard container in the waiting position resting against the rest and sliding plane, the suction gripping element being further configured and predisposed to be movable along the second through-window, from the waiting position to the second unloading position, and vice versa, so that the suction gripping element, when positioned at the waiting position and located in the second operative configuration can abut and retain by suction the face of a cardboard container brought into the waiting position by the suction gripping element of the first group and thus, once the suction gripping element of the first group is brought into the relative first non-operative configuration to release the cardboard container, can be movable along the second through-window to transfer the cardboard container from the waiting position to the second unloading position so that the articles contained therein can fall by gravity into the unloading channel through the opening of the abutting plane.

3. The apparatus of claim 2, wherein the first suction pick-up and transfer group comprises a belt loop-wound so as to comprise a straight branch arranged along the first through-window and a plate provided with a through-hole mounted on the straight branch, and with the suction gripping element of the first suction pick-up and transfer group borne by the plate so as to be movable with respect to the plate and to pass through the through-hole so as to be positionable in the relative first non-operative configuration and in the relative second operative configuration, the belt being activatable in two opposite movement directions so that the straight branch is movable in the first through-window in a first movement direction, so that the plate, and thus the suction gripping element of the first group, can be movable from the first pick-up position to the waiting position, and in a second movement direction opposite the first direction so that the plate, and thus the suction gripping element, can be movable from the waiting position to the first pick-up position.

4. The apparatus of claim 3, wherein the first suction pick-up and transfer group comprises a lateral abutting wall coupled to the suction gripping element and the plate comprises a through-slot for passage of the lateral abutting wall, the lateral abutting wall being movable together with the suction gripping element with respect to the plate so as to cross the through-slot and assume a projecting position from the rest and sliding plane, when the suction gripping element is located in the relative second operative configuration, so as to abut a lateral face of the cardboard container perpendicular to the rest and sliding plane, and upstream with respect to the unloading channel, and accompany the cardboard container during transfer thereof from the first pick-up position to the waiting position by means of the suction gripping element.

5. The apparatus of claim 3, comprising first activating means predisposed for activating the belt and second activating means predisposed for moving the suction gripping element of the first group, and the lateral abutting wall, with respect to the plate, and positioning the suction gripping element in the relative first non-operative configuration and second operative configuration.

6. The apparatus of claim 2, wherein the second suction pick-up and transfer group comprises a slide arranged posteriorly to the rest and sliding plane at the second through-window, wherein the slide comprises a through-hole with the suction gripping element of the second group being borne by the slide so as to be movable with respect to the slide and to pass through the through-hole of the slide so as to be positionable in the relative first non-operative configuration and in the relative second operative configuration, the slide being activatable in translation with respect to the rest and sliding plane and with respect to the second through-window in two opposite translation directions so that the suction gripping element of the second group is movable with respect to the second through-window in a first translation direction, in order to be movable from the waiting position to the second unloading position, and in a second translation direction, opposite the first translation direction, in order to be movable from the second unloading position to the waiting position.

7. The apparatus of claim 6, comprising third activating means, for translation activation of the slide with respect to the second through-window, and a movement group for movement of the suction gripping element of the second group with respect to the slide in order to position the suction gripping element in the relative first non-operative configuration and second operative configuration.

8. The apparatus of claim 1, comprising first sensor means arranged on the rest and sliding plane at the waiting position, second sensor means arranged on the rest and sliding plane at the second unloading position and third sensor means arranged on the rest and sliding plane at the first pick-up position, wherein first sensor means are configured in such a way as to detect a positioning of a cardboard container, by the first suction pick-up and transfer group, in the waiting position so that the second suction pick-up and transfer group can be activated in order to be positioned in the waiting position to abut and retain by suction the cardboard container, and carry out the subsequent transfer thereof into the second unloading position once the first group has released the grip on the cardboard container, wherein the second sensor means are configured in such a way as to detect a positioning of a cardboard container, by the second suction pick-up and transfer group, in the second unloading position, so that the first suction pick-up and transfer group can be moved to return into the first pick-up position in order to transfer a subsequent cardboard container from the first pick-up position to the waiting position and wherein the third sensor means are configured so as to detect the presence of a cardboard container in the first pick-up position and thus of at least a further container to be emptied internally of the store so that the first group can be activated to pick up the container and transfer said container to the waiting position.

9. The apparatus of claim 1, comprising an article accompanying plate predisposed and configured in such a way as to be movable with respect to the unloading channel so as to be positionable externally of the unloading channel and internally of the unloading channel, through a relative passage slot, in proximity of the relative inlet so as to intercept and support the articles falling from the open bottom of the cardboard container positioned in the second unloading position, the article accompanying plate, once positioned internally of the unloading channel in proximity of the inlet of the unloading channel in order to intercept the articles falling from the open bottom of the cardboard container, being movable downwards with respect to the unloading channel so as to accompany the articles for a portion internally of the unloading channel and then be retractile with respect to the unloading channel in such a way as to release the articles and cause the articles to descend freely down to the outlet of the unloading channel.

10. The apparatus of claim 9, comprising a first detecting means predisposed in such a way as to detect the presence or not of articles at the inlet of the unloading channel and a second detecting means arranged inferiorly of the first detecting means, to detect the presence or not of articles internally of the unloading channel.

11. The apparatus of claim 1, comprising a conveyor means predisposed at the outlet of the unloading channel and such as to receive the articles exiting from the unloading channel, the conveyor means being activatable to transfer the articles received from the unloading channel towards a packaging machine.

\* \* \* \* \*